2,923,657

METHOD AND COMPOSITION FOR COMBATING FUNGI

Nicolaas Dost and Rinke Berkenbosch, Amsterdam, Netherlands, assignors to Shell Development Company, Emeryville, Calif., a corporation of Delaware No Drawing. Application September 25, 1953
Serial No. 382,458

Claims priority, application Germany September 26, 1952

6 Claims. (Cl. 167—30)

This invention relates to compositions suitable for combating fungi and to a method of combating fungi. More particularly, it relates to a method and to compositions for protecting plants from destruction by fungi.

The control of fungus diseases in agricultural areas and especially on trees and crops has received wide-spread attention over a long period. Fruit trees, for example, are sprayed at a number of times during a season for the purpose of combating diseases. Crops, likewise, must be protected against the injury caused by the attack of phyto pathogenic organisms, especially where they are subject to prolonged humid conditions.

The substantial part of past investigations has been concerned with the use of inorganic agents for fungus control. While organic materials have received limited attention for this purpose, they are, in many instances, limited in their utility by their phytotoxic characteristics. Because of such properties many organic materials may be used for the preservation of such materials as wood or marine piling but could not be used on growing plants or trees. It is possible to apply some of these organic substances to plants in sufficiently great dilution that their phytotoxic properties are repressed, but in most instances their fungicidal activity then is too low to be of utility. Also, many of the organic materials which have been investigated decompose under the conditions of use.

It is an object of the present invention to provide new fungicidal compositions which exhibit substantially no phytotoxicity when applied to foliage and crops in concentrations high enough to effectively combat fungi. It is another object of this invention to describe a new method for combating fungi. Other objects and advantages will become apparent from the following detailed description.

In accordance with the present invention, it has now been found that salts of nitrosoarlyamines are particularly suitable foliage fungicides.

According to a preferred embodiment of the invention, it has been found that complexes of ar-nitrosoarylamines, particularly nitrosoanilines, and metal salts, are outstanding foliage fungicides.

According to another embodiment of the invention, strong inorganic acid salts of ar-nitrosoarylamines, particularly nitrosoanilines, have been found to be suitable for combating fungi.

The most suitable nitrosoarylamines, the salts of which are utilized in the present invention, are the ar-nitrosoanilines which have the following general structural formula:

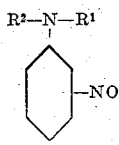

wherein $R^1$ and $R^2$ each represent a hydrogen atom or a hydrocarbon radical of not more than 16 carbon atoms and the nitroso radical occupies the ortho, meta or para position, and preferably the para position. Preferably, $R^1$ and $R^2$ each represent a hydrogen atom, a lower alkyl group of not more than about 8 carbon atoms, a cyclohexyl group or a phenyl group. Representative suitable nitrosoarylamines include: N - methyl - p - nitrosoaniline; N-phenyl-p-nitrosoaniline; N,N-diethyl-p-nitrosoaniline; N,N-dimethyl-p-nitrosoaniline; N-ethyl-N-cyclohexyl-p-nitrosoaniline; N-methyl-N-cyclohexyl-p-nitrosoaniline; N,N-diphenyl-p-nitrosoaniline; N-ethyl-N-phenyl-p-nitrosoaniline; N,N-dicyclohexyl-p-nitrosoaniline; N,N-diisopropyl-p-nitrosoaniline; N-isopropyl-N-ethyl-p-nitrosoaniline; N,N-dibutyl-p-nitrosoaniline; N,N-dimethyl-m-nitrosoaniline; N,N-diphenyl-m-nitrosoaniline; N-ethyl-N-cyclohexyl-m-nitrosoaniline; N-(p-chlorophenyl)-p-nitrosoaniline; N,N-bis(p-chlorophenyl)-p-nitrosoaniline; N,N-dimethyl-2-chloro-4-nitrosoaniline; N,N-diphenyl-2-bromo-4-nitrosoaniline; N,N-dimethyl-4-nitrosonaphthylamine; N,N-diphenyl-4-nitrosonaphthylamine; N,N-diethyl-4-nitrosonaphthylamine; N-ethyl-N-cyclohexyl-4-nitrosonaphthylamine; N-methyl-4-nitrosonaphthylamine; N-(p-chlorophenyl)-4-nitrosonaphthylamine; and the like.

In the formation of the metal salt complexes of the above nitrosoarylamines, metal salts of either inorganic or organic acids can be used; however, inorganic acid salts are generally preferred. The salts can be either neutral or acidic. The heavy metal salts such as copper, aluminum, iron, nickel, cobalt, zinc, mercury, and the like, are particularly suitable; however, alkaline earth metal salts can also be used. The copper salt complexes of the present invention produce the most outstanding results. Representative metal salts which can be used include: CuCl, $CuCl_2$, $CUSO_4$, $Cu(NO_3)_2$, $FeCl_3$, $Fe(NO_3)_3$, $FeSO_4$, $Fe_2(SO_4)_3$, $NiCl_2$, $NiSO_4$, $Ni(NO_3)_2$, $Ni(ClO_4)_2$, $HgCl_2$, $Hg(NO_3)_2$, $HgSO_4$, $CdCl_2$, $CoCl_2$, $Co(NO_3)_2$, $CoSO_4$, $MnCl_2$, $MnSO_4$, $SnCl_2$, $SbCl_2$, $CaCl_2$, $Ca(NO_3)_2$, $BaCl_2$, $ZnCl_2$, $ZnSO_4$, $ZnHPO_4$, $CuHPO_4$, $Zn(NO_3)_2$, $AlCl_3$, $Al(NO_3)_3$, $Al_2(SO_4)_3$, copper alkylphenolate, mercury alkylphenolate, zinc alkylphenolate, aluminum alkylphenolate, iron alkylphenolate, copper acetate, zinc acetate, copper propionate, aluminum propionate, copper benozate, zinc benzoate, and the like.

The complexes of the above metal salts and nitrosoarylamines can be prepared by adding a solution of the metal salt to a solution of the nitrosoarylamine compound at a suitable temperature. Preferably, the solvent for the metal salt should mix homogeneously with the solvent for the nitrosoarylamine. Suitable solvents are the polar organic compounds such as methanol, ethanol, isopropanol, acetone, methyl ethyl ketone, methyl isopropyl ketone, formamide, and the like. After the reaction has taken place, the complex formed will, depending upon the nature of the solvents, either precipitate directly or must be precipitated by diluting the reaction mixture with some other solvent in which the complex is substantially insoluble and which is homogeneously miscible with the original solvent or mixture of solvents. For example, the reaction mixture can be poured into water. Precipitation can also be effected by evaporation of the solvents or solvent mixture from the reaction mixture. The molar ratio of the components of the complex can vary within wide limits, provided that the ratio of the molar amount of the nitrosoarylamine to the molar amount of the metal salt is equal to the quotient of two integers and does not exceed either the highest possible valency of the metal ion or the valency of the acid anion, whichever valency is higher. Typical metal salt complexes are given in the following list. For the sake of brevity, N,N-dimethyl-p-nitrosoaniline is denoted by $B_1$, N-phenyl-p-nitrosoaniline by $B_2$ and N-ethyl-N-cyclohexyl-p-nitrosoaniline by $B_3$.

$B_1 \cdot FeCl_3$
$B_1 \cdot FeSO_4$
$(B_1)_3 \cdot FeCl_3$
$(B_1)_3 \cdot Fe_2(SO_4)_3$
$(B_1)_3 \cdot Fe(NO_3)_3$
$(B_1)_2 \cdot CuCl_2$
$(B_1)_2 \cdot Cu(NO_3)_2$
$B_1 \cdot CuSO_4$
$(B_1)_3 \cdot ZnHPO_4$
$(B_1)_3 \cdot AlCl_3$
$B_1 \cdot NiCl_2$
$(B_1)_2 \cdot Ni(NO_3)_2$
$(B_1)_2 \cdot Ni(ClO_4)_2$
$B_1 \cdot MnCl_2$
$(B_1)_2 \cdot HgCl_2$
$(B_1)_2 \cdot Hg(NO_3)_2$
$B_1 \cdot SnCl_2$
$(B_1)_3 \cdot SbCl_3$
$B_1 \cdot CdCl_2$
$(B_2)_2 \cdot CuCl_2$
$B_2 \cdot CuSO_4$
$(B_2)_2 \cdot ZnCl_2$
$(B_2)_3 \cdot FeCl_3$
$(B_3)_2 \cdot CuCl_2$ The preparation of typical metal salt complexes of the present invention is given in the following examples:

EXAMPLE I

Preparation of the $CuCl_2$ complex of N,N-dimethyl-p-nitrosoaniline $((B_1)_2 — CuCl_2)$ 1 mole (150 grams) of $B_1$ was dissolved in 600 cc. of acetone. While vigorously stirring, a solution of 0.5 mole (67 grams) of $CuCl_2$ in 70 cc. of methanol was added. The precipitation of $(B_1)_2 \cdot CuCl_2$ occurs at once. After continued stirring for one hour the precipitate was filtered off and washed with a small amount of cold acetone. Yield: 196 grams of dry product=90% by wt. in respect of the total weight of the $B_1$ and $CuCl_2$ employed.

EXAMPLE II

Preparation of the CuCl complex of N,N-dimethyl-p-nitrosoaniline $(B_1 \cdot CuCl)$ A solution of 0.05 mole (7.5 grams) of $B_1$ in 32 grams of acetone was added to a solution of 0.05 mole (5 grams) of CuCl in 60 cc. of formamide. The precipitate formed was filtered off. It was washed first with a small amount of cold formamide and then with acetone. Yield: 10 grams=80% by wt. in respect of the total weight of $B_1$ and CuCl employed.

EXAMPLE III

Preparation of the $CuCl_2$ complex of N-phenyl-p-nitrosoaniline $([B_2]_2 \cdot BuCl_2)$ A solution of 113 grams of $CuCl_2 \cdot 2$ aq. in 120 cc. of methanol was added, while continuously stirring, to a solution of 260 grams of $B_2$ in 2600 cc. of acetone to which 20 grams of Triton X–155 had previously been added. (Triton X–155 is a commercial surface-active agent consisting of alkylphenol ethers of polyethylene glycol.)

The finely divided precipitate formed was filtered off and dried. Yield: 343 grams=97% by wt. in respect of the total weight of the $B_2$ and $CuCl_2$ employed. The average size (greatest linear dimension) of the particles in the precipitate was approximately 3 microns. The product could be directly employed as a wettable powder.

EXAMPLE IV

Preparation of the $FeCl_3$-complex of N-phenyl-p-nitrosoaniline $[(B_2)_3 \cdot FeCl_3]$ A solution of 0.033 mole (5.4 grams) $FeCl_3$ in 20 cc. of acetone was added to a solution of 0.1 mole (20 grams) of $B_2$ in 60 cc. of acetone.

A precipitate formed after the solvent had been removed by reduced pressure distillation. Yield: 25.4 grams=100% by wt, in respect of the total weight of the $B_2$ and $FeCl_3$ employed.

EXAMPLE V

Preparation of the $CuCl_2$ complex of N-ethyl N-cyclohexyl nitrosoaniline $[(B_3)_2 \cdot CuCl_2]$ A solution of 0.125 mole (21 grams) of $CuCl_2 \cdot 2$ aq. in 20 cc. of methanol was continuously added while stirring to a solution of 0.25 mole (53 grams) of $B_3$ in acetone to which 0.5 gram of Triton X–155 had previously been added. The precipitate formed was filtered off, washed with a small amount of cold methanol and dried. Yield: 60 grams=80% by wt. in respect of the total weight of the $B_3$ and $CuCl_2$ employed.

The strong inorganic acid salts of nitrosoarylamines which are also suitable for use in accordance with the present invention include, for example, salts of the above nitrosoarylamines and acids such as hydrochloric acid, hydrobromic acid, nitric acid, sulfuric acid, and phosphorus acids, such as phosphoric acid. Phosphorus acid salts of nitrosoarylamines have been found to be particularly suitable for combating fungi.

The inorganic acid salts are readily prepared by direct neutralization of a nitrosoarylamine with the desired acid. The yield of phosphorus acid salts of a nitrosiarylamine is increased by carrying out the neutralization in the presence of a polar solvent such as acetone, ethyl alcohol, methyl alcohol, methyl ethyl ketone, etc.

The salts of the present invention can be used alone or in combination with other fungicidal, vericidal, insecticidal or acaricidal materials, the action of which may be ether internal or external, with plant nutritives, with plant hormones, and the like. Surface-active agents and, if necessary or desirable, stickers can be present. Any conventional surface-active agent, for example, alkyl sulfate salts, alkyl aryl sulfonate salts, sulfo-succinate salts, ethers from polyethylene glycols and alkylated phenols, and the like can be employed. If the fungicidal agents are employed in the form of emulsions or suspensions, for example, in water, solvents such as oils, emulsifiers, emulsion stabilizers, and the like can be added.

The salts of the present invention can be applied to the plants to be treated in various ways. For example, dusting powders comprising the present salts and an inert solid carrier can be employed. Inert solid materials such as talc, chalk, and clay minerals, e.g., kaolinite, pyrophyllite, montmorillonite, attapulgite, etc., are suitable carriers. Aqueous suspensions of the active salt with, if desired, an inert solid carrier, can be utilized. Such suspensions are stabilized by the addition of a surface-active agent. Wettable powders which comprise the active agent and a surface-active agent and which are dispersible in water can be prepared as concentrate compositions. The amount of surface-active agent used is generally from about 0.01% to about 0.1% by weight, based on the weight of the active agent.

The salts of the present invention can also be utilized dissolved in non-phytotoxic hydrocarbon oils or in polar or polarizable organic solvents. Such solutions can, if desired, be dispersed in water with the aid of a surface-active agent and used as aqueous emulsions. Solutions of the salts in inorganic liquids such as dichlorodibromomethane, diethyl ether or methyl ethyl ether are suitable for use as aerosols.

Preferably, as far as possible, aqueous solutions of the active salts are used. To prevent such solutions from being washed off the plants by rain, it is generally desirable to add a sticker to the composition. Heavy, substantially paraffinic mineral oils are suitable stickers. Other stickers which can be used include gelatin, carboxymethyl cellulose, sodium silicate and dichromate gelatin. Cosolvents, such as oxygenated compounds, e.g., isopropanol, acetone, methyl ethyl ketone, butanone, dioxane, etc., and surface-active agents are generally added to such mixtures to promote homogeneity.

In the case of active salts which are insoluble in water, suspensions of solid salts in water can be obtained with the aid of surface-active agents. Preferably the linear dimensions of the solid particles should be below about 5 microns. With respect to the metal salt complexes of nitrosoarylamines of the present invention, it has been found that the addition of a relatively small proportion of a preferably non-ionic surface-active agent to the reaction mixture prior to precipitation of the complex salt results in solid particles of the desired size. Suitable non-ionic surface-active agents which can be used include alkylphenol ethers of polyethylene glycols which are sold under the trade name "Triton X," sorbitan monocarboxylic acid esters sold under the trade name "Span" polyalkylenoxy derivatives thereof which are sold under the trade name "Tween." The amount of surface-active agent used depends upon the nature of the complex to be formed and generally varies between about 0.5% and about 5% by weight, based on the amount of the nitrosoarylamine compound in the reaction mixture.

The water-insoluble active salts of the present invention can also be formulated as oil-bound suspensions which are prepared by mixing together, preferably by grinding, the solid active salt, a suitable non-phytotoxic mineral oil, a minor proportion of water and a surface-active agent, and dispersing the resulting mixture in water.

The active salts of the present invention are generally applied to plants by means of compositions containing from about 0.01% to about 2%, and preferably from about 0.01 to about 0.5%, by weight of the active ingredient.

The invention is illustrated by the following examples which are not to be construed as limiting the specification and claims in any manner:

EXAMPLE VI

Various salts of the present invention were tested for their effectiveness as fungicides on different plants. For purposes of comparison, the corresponding free bases were also tested. For the sake of brevity, $B_1$ is used to denote N,N-dimethyl-p-nitrosoaniline and $B_2$ is used to denote N-phenyl-p-nitrosoaniline. The salts of $B_1$ were applied to the plants in aqueous solution, and the salts of $B_2$ were applied in aqueous emulsion. The composition of a typical concentrate which can be dispersed in water to obtain an aqueous emulsion is as follows: 24% by weight of $(B_2)_3 \cdot FeCl_3$, 40% by weight of a hydrocarbon oil having a boiling range of from 316° to 409° C., a viscosity at 25° C. of 95 centipoises and an unsulfonatable residue of 93% w., 30% by weight of water and 6% by weight of "Triton X–155" which is a commercial surface-active agent consisting of alkylphenol ethers of polyethylene glycols.

The results are given in Table I. The fungicidal effectiveness is indicated by the "degree of suppression." The degree of suppression was determined by the following method:

Test plants were sprayed with the composition containing the active salt until the liquid dropped from the leaves. After the spray liquid dried, usually after about two days, the plants were exposed to contamination with the fungus. Depending on the kind of test plant and of the fungus, contamination was effected either by inoculation of the plant or by placing the plant in contaminated surroundings, for example, in a greenhouse in which plants affected by the fungus were present. Conditions were chosen such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure of the degree to which suppression of the fungus has succeeded. Hereinafter, this quantity, expressed in percent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

TABLE I

| Active Ingredient | Rust on Beans | | Rust on Rye | | Phytophthora on Potatoes | | Phytophthora on Tomatoes | |
|---|---|---|---|---|---|---|---|---|
| | Concentration, percent w. | Degree of Suppression, percent | Concentration, percent w. | Degree of Suppression, percent | Concentration, percent w. | Degree of Suppression, percent | Concentration, percent w. | Degree of Suppression, percent |
| $B_1$ [1] | 0.1 | 0 | 0.5 / 0.1 | 25 / 0 | 0.1 | 0 | 0.1 | 0 |
| $(B_1)_2 \cdot CuCl_2$ | 0.1 | 85 | 0.1 | 73 | 0.05 | 43 | 0.05 | 96 |
| $B_1 \cdot CuCl$ | 0.2 | 67 | 0.2 | 66 | 0.05 | 72 | 0.05 | 80 |
| $(B_1)_2 \cdot Cu(NO_3)_2$ | 0.1 | 90 | 0.1 | 79 | | | 0.05 | 71 |
| $B_1 \cdot CuSO_4$ | 0.1 | 88 | | | 0.05 | 46 | 0.05 | 90 |
| $(B_1)_2 \cdot ZnCl_2$ | 0.1 | 73 | 0.1 | 79 | 0.05 | 33 | 0.15 | 93 |
| $B_1 \cdot FeCl_2$ | 0.1 | 87 | 0.1 | 66 | 0.05 | 33 | 0.15 | 59 |
| $(B_1)_3 \cdot FeCl_3$ | 0.1 | 68 | 0.1 | 71 | 0.05 | 25 | 0.05 | 90 |
| $(B_1)_2 \cdot Ni(ClO_4)_2$ | 0.1 | 90 | 0.1 | 75 | | | 0.05 | 93 |
| $(B_1)_3 \cdot AlCl_3$ | 0.2 | 89 | 0.2 | 95 | | | 0.05 | 93 |
| $B_1 \cdot H_3PO_4$ | 0.1 | 57 | 0.3 | 65 | | | 0.1 | 90 |
| $B_1 \cdot HCl$ | 0.2 | 86 | 0.2 | 90 | | | | |
| $B_2$ | 0.3 | 45 | | | 0.05 | 16 | 0.05 | 21 |
| $(B_2)_2 \cdot CuCl_2$ | 0.1 | 85 | | | 0.05 | 78 | 0.05 | 78 |
| $(B_2)_2 \cdot ZnCl_2$ | | | | | 0.05 | 52 | 0.05 | 78 |
| $(B_2)_3 \cdot FeCl_3$ | | | | | 0.05 | 40 | 0.05 | 83 |

No phytotoxicity occurred at the concentrations at which the above salts were used.

From the data in Table I, it is readily seen that the fungicidal effectiveness of the salts of the present invention is far greater than that of the corresponding free bases.

EXAMPLE VII

A ferric chloride complex of N-phenyl-p-nitrosoaniline, a copper chloride complex of N,N-dimethyl-p-nitrosoaniline, and a copper chloride complex of N-phenyl-p-nitrosoaniline were tested for phytotoxicity on 3 plant species and for disease control against 4 diseases. The 3 plant species were tomato, celery and beans. The 4 diseases were *Phytophthora infestans* (late blight of tomatoes), *Septoria apii-graveolentis* (late blight of celery), *Uromyces appendiculatus* (rust of beans) and *Erysiphe polygoni* (powdery mildew of beans). The results are given in Table II.

TABLE II

| Salt | Concentration percent w. | Mean Phytotoxicity (3 Plant Species) | Mean percent Disease Control (4 Diseases) |
|---|---|---|---|
| Oil-bound suspension of ferric chloride complex of N-phenyl-p-nitrosoaniline | 0.21 | 0 | 36.3 |
| Copper chloride complex of N,N-dimethyl-p-nitrosoaniline | 0.05 | 0 | 64.5 |
| Wettable powder containing copper chloride complex of N-phenyl-p-nitrosoaniline | 0.2 | 0 | 71.3 |

We claim as our invention:

1. The method of combatting fungi which comprises subjecting the fungi to the action of a fungitoxic amount of a metal salt of an ar-nitrosoaniline of the formula

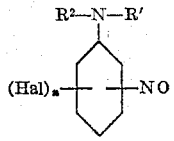

wherein R' and R² each represents a member of the group consisting of hydrogen, and lower alkyl, cyclohexyl, phenyl and halo-substituted phenyl groups, Hal represents halogen and $n$ is an integer from 0 to 1.

2. The method of combatting fungi which comprises subjecting the fungi to the action of a fungitoxic amount of an inorganic acid salt of an ar-nitrosoaniline of the formula

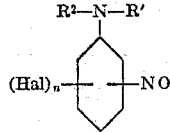

wherein R' and R² each represents a member of the group consisting of hydrogen, and lower alkyl, cyclohexyl, phenol and halo-substituted phenyl groups, Hal represents halogen and $n$ is an integer from 0 to 1, said inorganic acid salt being a member of the group consisting of the chlorides, bromides, nitrates, sulfates and phosphates.

3. The method of combatting fungi which comprises subjecting the fungi to the action of a fungitoxic amount of a copper salt of an ar-nitrosoaniline of the formula

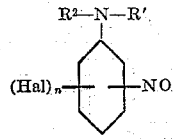

wherein R' and R² each represents a member of the group consisting of hydrogen, and lower alkyl, cyclohexyl, phenyl and halo-substituted phenyl groups, Hal represents halogen and $n$ is an integer from 0 to 1.

4. The method of combatting fungi which comprises subjecting the fungi to the action of a fungitoxic amount of a zinc salt of an ar-nitrosoaniline of the formula

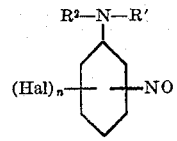

wherein R' and R² each represents a member of the group consisting of hydrogen, and lower alkyl, cyclohexyl, phenyl and halo-substituted phenyl groups, Hal represents halogen and $n$ is an integer from 0 to 1.

5. The method of combatting fungi which comprises subjecting the fungi to the action of a fungitoxic amount of an aluminum salt of an ar-nitrosoaniline of the formula

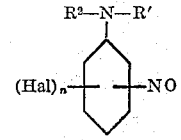

wherein R' and R² each represents a member of the group consisting of hydrogen, and lower alkyl, cyclohexyl, phenyl and halo-substituted phenyl groups, Hal represents halogen and $n$ is an integer from 0 to 1.

6. The method of combatting fungi which comprises subjecting the fungi to the action of a fungitoxic amount of an iron salt of an ar-nitrosoaniline of the formula

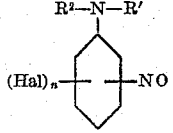

wherein R' and R² each represents a member of the group consisting of hydrogen, and lower alkyl, cyclohexyl, phenyl and halo-substituted phenyl groups, Hal represents halogen and $n$ is an integer from 0 to 1.

References Cited in the file of this patent

UNITED STATES PATENTS

| 2,287,235 | Flint | June 23, 1942 |
| 2,490,925 | Schertz | Dec. 13, 1949 |
| 2,635,978 | Massengale | Apr. 21, 1953 |

FOREIGN PATENTS

| 747,835 | Germany | Oct. 16, 1944 |
| 146,024 | Australia | Apr. 9, 1952 |

OTHER REFERENCES

Frear: A Catalogue of Insect. and Fung., 1948, p. 44 of vol. 2 and p. 152 of vol. 1.

Chem. Abst., vol. 44, 1950, pp. 8236 and 8237.